United States Patent [19]

Andreas et al.

[11] Patent Number: 4,981,279

[45] Date of Patent: Jan. 1, 1991

[54] ADJUSTABLE REAR VIEW MIRROR

[75] Inventors: Joseph S. Andreas, Gettysburg; Larry J. Harter, Medon, both of Ohio; Charles A. Willoughby, Royal Oak, Mich.

[73] Assignee: Sheller-Globe Corporation, Detroit, Mich.

[21] Appl. No.: 432,471

[22] Filed: Nov. 7, 1989

[51] Int. Cl.⁵ .................................. A47G 1/24
[52] U.S. Cl. .................................. 248/483; 248/478; 350/632; 403/90
[58] Field of Search .............. 248/483, 481, 479, 476, 248/478, 475.1, 477, 482, 484, 468; 403/90, 127, 114, 143; 350/632

[56] References Cited

U.S. PATENT DOCUMENTS

| | | | |
|---|---|---|---|
| 3,434,688 | 3/1969 | Engelmann | 248/483 |
| 3,512,746 | 5/1970 | Vitaloni et al. | 248/483 |
| 4,401,289 | 8/1983 | Fisher et al. | 248/483 |
| 4,558,840 | 12/1985 | Manzoni | 248/484 X |
| 4,651,965 | 3/1987 | Vigna et al. | 248/483 |
| 4,824,065 | 4/1989 | Manzoni | 248/483 |
| 4,877,214 | 10/1989 | Toshiaki et al. | 248/483 |

Primary Examiner—Ramon O. Ramirez
Attorney, Agent, or Firm—Barnes, Kisselle, Raisch, Choate, Whittemore & Hulbert

[57] ABSTRACT

An adjustable rear view mirror for an automotive vehicle adapted to be mounted on a door and comprising a housing including a mounting flange at one end and an opening adjacent the other end, an end bracket in the housing, a mirror and a mounting mechanism supporting the mirror in the opening of the housing. The mounting mechanism comprises an adaptor connected to the mirror, a cup, a sleeve and a retainer. The adaptor includes a spherical portion having a slot. The cup is mounted on the end bracket, or alternatively, on the housing and engages the outer spherical portion of the adaptor. The sleeve has a rib on its outer surface and spaced from the rib is a groove on the inner surface of the sleeve. The sleeve engages the inner surface of the adaptor and is positioned so the rib is received in a slot of the adaptor. The retainer engages the inner surface of the sleeve and has a rib received in the groove of the sleeve. A spring yieldingly urges the retainer on the cup. A universally mounted handle is mounted on the door and includes an end portion that engages the mirror mounting mechanism to adjust the mirror in a universal manner.

18 Claims, 4 Drawing Sheets

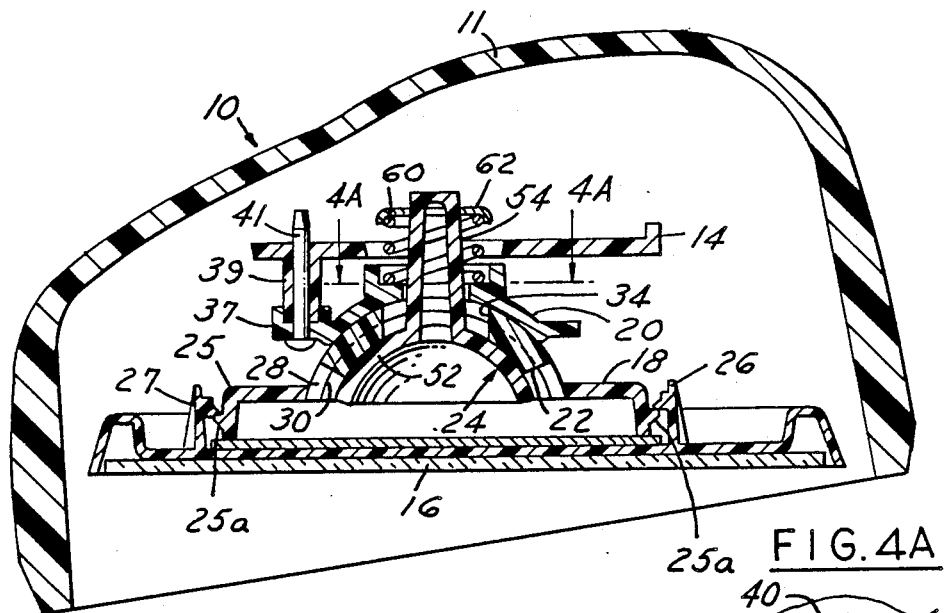
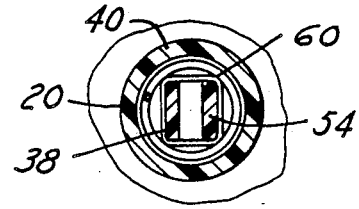
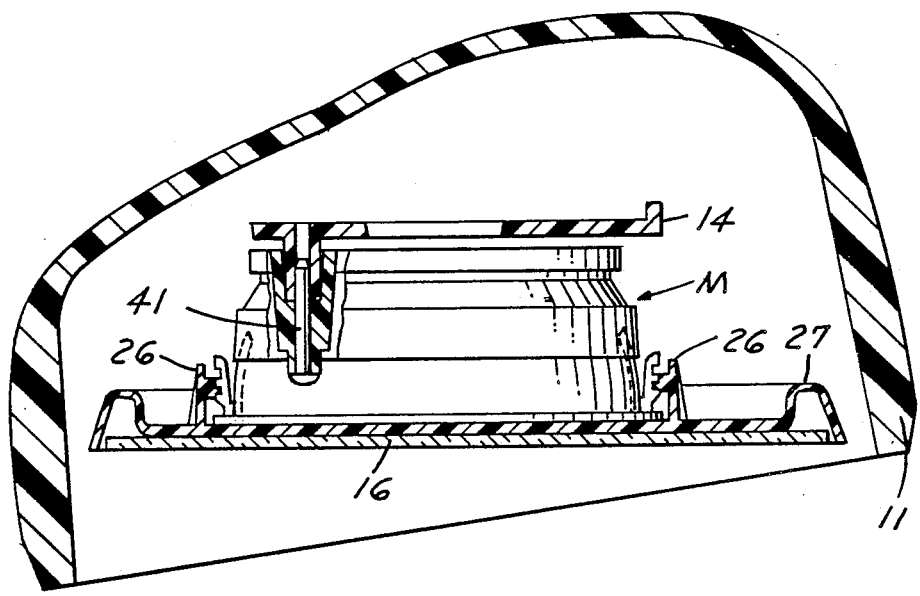

ADJUSTABLE REAR VIEW MIRROR

This invention relates to rear view mirrors such as used on automobiles and trucks.

BACKGROUND OF THE INVENTION

In adjustable rear view mirrors for automobiles and trucks, it is common to have a housing with an internal mechanism which supports the mirror in the housing. The mechanism often utilizes levers or cables or a motor mounted within the housing for adjusting the mirror Among the objectives of the present invention are to provide an adjustable rear view mirror which utilizes a novel manually operated mechanism; wherein the mechanisms for other types of adjustments may be readily interposed in place of the manual mechanism; and wherein the mechanism utilizes a minimum number of parts.

In accordance with the invention, an adjustable rear view mirror for an automotive vehicle adapted to be mounted on a door and comprising a housing including a mounting flange at one end and an opening adjacent the other end, an end bracket in the housing, a mirror and a mounting mechanism supporting the mirror in the opening of the housing. The mounting mechanism comprises an adaptor connected to the mirror, a cup, a sleeve and a retainer. The adaptor includes a spherical portion having a slot. The cup is mounted on the end bracket, or alternatively, on the housing and engages the outer spherical portion of the adaptor The sleeve has a rib on its outer surface and spaced from the rib is a groove on the inner surface of the sleeve. The sleeve engages the inner surface of the adaptor and is positioned so the rib is received in a slot of the adaptor. The retainer engages the inner surface of the sleeve and has a rib received in the groove of the sleeve A spring yieldingly urges the retainer on the cup. A universally mounted handle is mounted on the door and includes an end portion that engages the mirror mounting mechanism to adjust the mirror in a universal manner.

DESCRIPTION OF THE DRAWINGS

FIG. 4 is a sectional view taken along the line 4—4 in FIG. 3;

FIG. 4A is a partial sectional view taken along the line 4A—4A in FIG. 4;

FIG. 6 is a view similar to FIG. 4 showing a modified form of mirror;

DESCRIPTION

Figure 1:
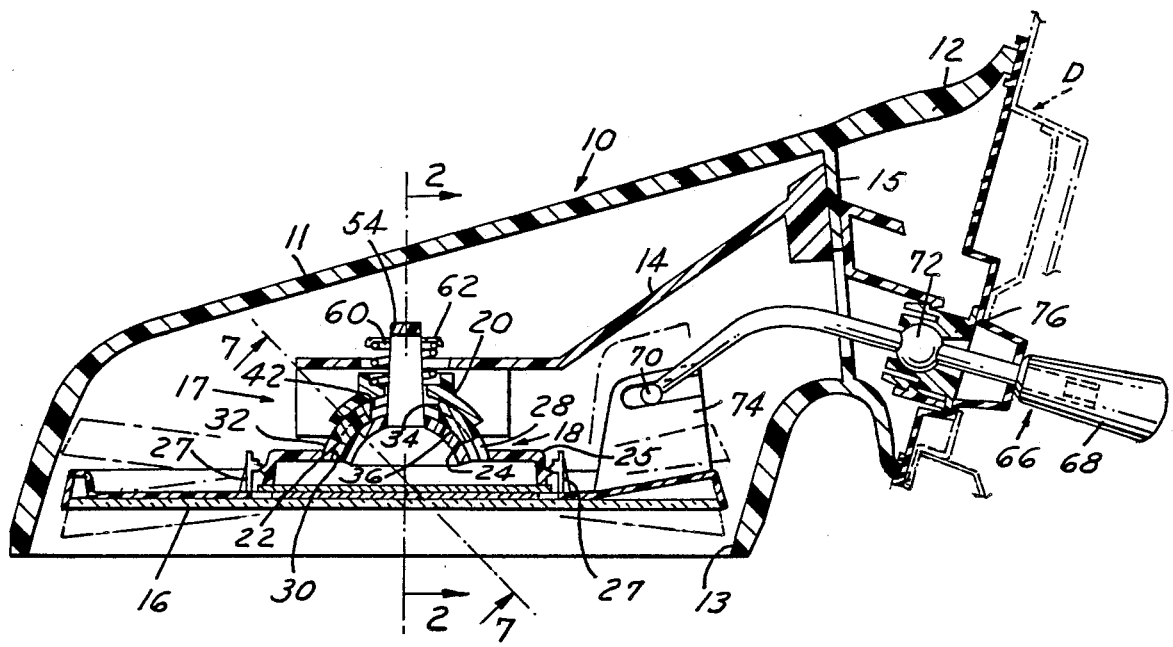
FIG. 1 is a sectional view taken along the line 1—1 in FIG. 3.

Referring to FIGS. 1-4, an adjustable rear view mirror 10 for an automotive vehicle embodying the invention is adapted to be mounted on a door D and comprises a housing 11 which has a mounting flange 12 at one end and an opening 13 adjacent the other end. Housing 11 encloses a mounting bracket 14 supported on a wall 15 of the housing 11, a mirror 16 and a mounting mechanism 17 for supporting the mirror 16 on the bracket 14 in the opening 13.

The mirror mounting mechanism 17 comprises an adaptor 18 connected to mirror 16. The adaptor 18 is interposed between a cup 20 on one side and a sleeve 22 and a retainer 24 on the other side.

Figure 2:
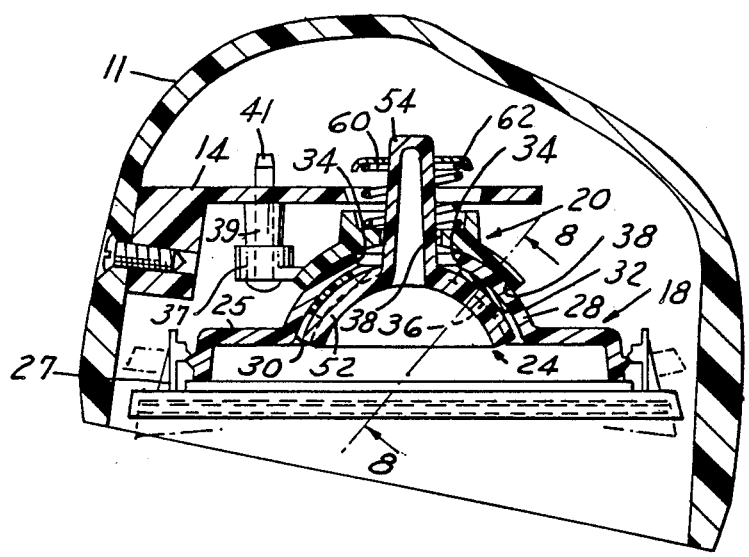
FIG. 2 is a sectional view taken along the line 2—2 in FIG. 1.
Figure 7:
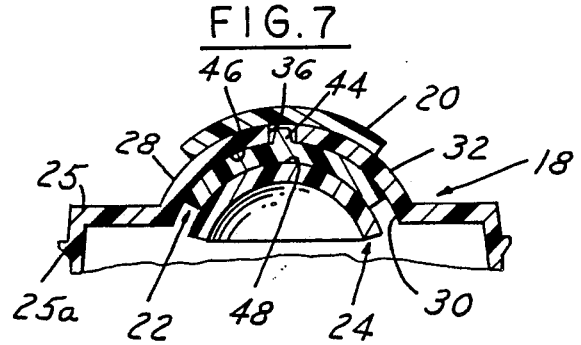
FIG. 7 is a sectional view taken along line 7—7 in FIG. 1.
Figure 8:
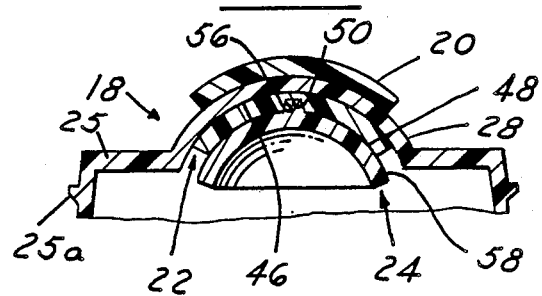
FIG. 8 is a sectional view taken along line 8—8 in FIG. 2.

The adaptor 18 comprises a base portion 25 including a peripheral lip 25a detachably connected to a snap-on wall 26 of a mirror mounting case 27 that supports the mirror 16. The adaptor 18 includes a hemispherical portion 28 formed centrally on base portion 25. The spherical portion 28 has an inner concave surface 30, an outer convex surface 32 and a centrally located opening 34 which is preferably rectangular. As shown in FIGS. 1, 2 and 7, the adaptor 18 has at least one slot 36 on the spherical portion between the opening 34 and the edge of the spherical portion 28. Preferably, a pair of aligned slots 36 are provided axially on opposite sides of opening 34 of the spherical portion 28.

The cup 20 has a spherical shape with an integral bracket 37 and a centrally located non-circular opening 38 which is preferably rectangular and smaller than adaptor opening 34. The bracket 37 is joined to an extension 39 of mounting bracket 14 by a pin 41. As shown in FIG. 4A, the cup 20 has a cylindrical retaining wall 40 on its outer surface surrounding but spaced from opening 38. The cup 20 is mounted on end bracket 14 and is positioned so the spherical inner surface of the cup 20 slidably engages the outer convex surface 32 of the adaptor 18.

The sleeve 22 has a hemispherical shape having a centrally located opening 42 which is preferably the same rectangular shape and size of adaptor opening 34. The sleeve 22 includes at least one rib 44 on its outer surface 46. Preferably a pair of aligned ribs 44 are positioned axially on opposite sides of the opening 42. At least one groove 50 is provided on the inner surface 48 of the sleeve 22 in spaced relation to the rib 44 on the outer surface 46 and preferably 90° from the rib 44. Preferably a pair of aligned grooves 50 are axially on opposite sides of opening 42. The outer surface 46 of the sleeve 22 engages the inner surface 30 of the adaptor 18 and is positioned so the ribs 44 engage the slots 36 of the adaptor 18 to allow for limited relative movement in a single plane.

Retainer 24 includes a spherical portion 52 and a stem portion 54 preferably hollow with a closed end. The stem portion 54 has a rectangular cross section that is complementary to the rectangular opening 38 of cup 20. The spherical portion 52 has at least one rib 56 on the outer surface 58, preferably a pair of aligned ribs 56 on opposite sides of stem 54. The retainer 24 is positioned so that the stem portion 54 passes through the centrally located openings 38, 40, 42 on the adaptor, cup and sleeve. The stem portion 54 extends into cup opening 38 so that the stem 54 is restricted by stationary opening 38 from rotating about the axis of the stem portion 54. Also, the exterior ribs 56 of the retainer 24 engage in grooves 50 on the inner surface of the sleeve 22 to provide limited relative movement in a plane at an angle to the plane of relative movement between the adaptor 18 and the sleeve 22. Preferably the angle between the planes is 90°.

A spring 60 is placed on top of the cup 20 within retaining wall 40 and surrounds the stem 54 of the retainer 24. A retainer 62 is demountably attached to the top of stem 54 to capture the compressed spring 60. The compressed spring 60 yieldingly urges the cup 22 against the adaptor 18 and urges the retainer 24 against the sleeve 22 and against the adaptor 18.

A manual control apparatus 66 is mounted to the door D and enclosed partially by the mounting flange 12 of the housing 11. The control 66 includes a handle portion 68, a transversely extending end portion 70 and a central pivot 72. The end portion 70 engages a mirror case extension 74 attached to mirror mounting case 27. The pivot 72 is captured in a mounting seat 76 that allows limited rotational movement.

Figure 5:
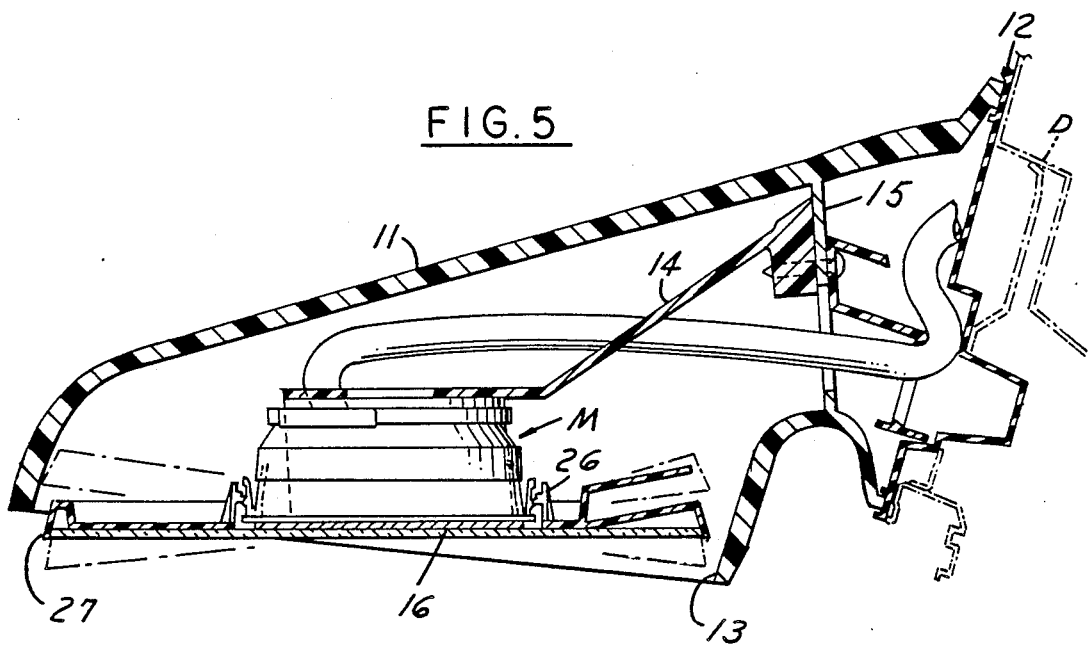
FIG. 5 is a view similar to FIG. 1 showing a modified form of mirror.
Figure 3:
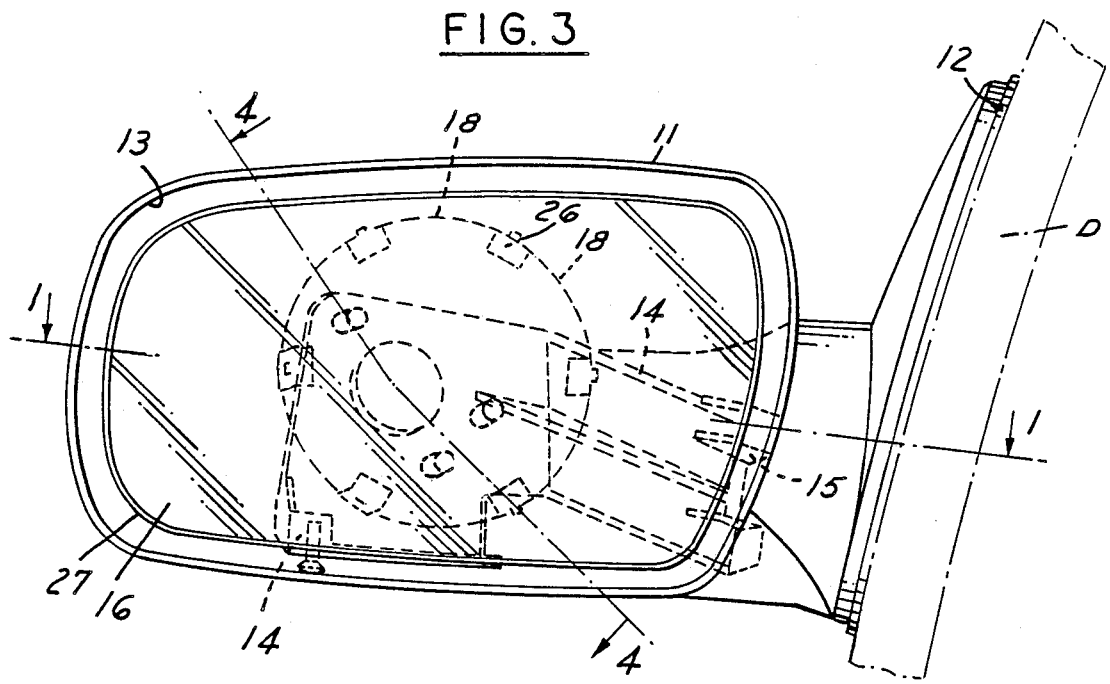
FIG. 3 is an elevational view of the adjustable rear view mirror.

FIGS. 5 and 6 show a standard motor M for an electric rear view mirror control unit mounted to extension 39 of mounting bracket 14 of housing 11 and engaging wall 26 of mirror case 27. FIGS. 5 and 6 illustrate that there is no need to modify the housing 11 or mirror case 27 for a conversion to an electrically operated mirror assembly.

In operation, an operator from inside the vehicle grasps the handle portion 68 and rotates the handle to adjust the mirror. Rotation of the handle portion 68 is limited by the mounting seat 76 enclosing pivot 72. As the handle is moved, the end portion 70 translates the motion through bracket extension 74 and the mirror 16. The movement of the mirror 16 is restricted to limited relative movement in the two planes defined by the interengagement between the sleeve 22 and the adaptor 18 and the sleeve 22 and the retainer 24.

The interengaging groove and rib arrangement of sleeve 22 and retainer 24, allows relative mirror movement about a first plane while the interengaging rib and slot arrangement between the sleeve 22 and the adaptor 18 allows limited relative mirror movement in a second plane at an angle to the first plane. The combination of these two interengaging arrangements allows the adaptor 18 and therefore the mirror 16 mounted on the adaptor 18, limited movement about a fixed pivot. The cup 20 and retainer 24 act as a fixed pivot for the adaptor 18. The bracket 37 of cup 20 is secured to extension 39 of mounting bracket 14 by pin 41, thereby securing cup 20 in a fixed stationary position. Retainer 24 is urged toward the cup 20 by spring 60 and the complementary fit between stem portion 54 and fixed cup opening 38 prevents the adaptor 18 and mirror 16 from rotating about the axis through stem portion 54 and perpendicular to the mirror plane.

It can thus be seen that there has been provided an adjustable rear view mirror for automotive vehicles which utilizes a novel manually operated mechanism; wherein the mechanisms for other types of adjustments may be readily interposed in place of the manual mechanism; and wherein the mechanism utilizes a minimum number of parts.

We claim:

1. A mounting mechanism for supporting a mirror:
   a bracket for supporting the mounting mechanism,
   a cup having an inner spherical portion, said cup secured to said bracket and fixedly held in a stationary position,
   an adaptor having a spherical portion, said spherical portion engaged to said inner spherical portion of said cup,
   a sleeve having a hemispherical shape, said sleeve engaging to the interior of said spherical portion of said adaptor,
   a retainer having a spherical portion, said spherical portion engaging the interior of said sleeve,
   means for mounting the mirror on said adaptor,
   means for maintaining said cup, said adaptor, said sleeve and said retainer in assembled relationship while permitting relative movement,
   means for preventing relative rotational movement of the mirror about an axis perpendicular to the mounting mechanism,
   interengaging means for limiting relative movement between said adaptor and said sleeve in a first plane, and
   interengaging means for limiting relative movement between said sleeve and said retainer in a second plane at an angle to the first plane,
   said means limiting relative movement between said adaptor and said sleeve including a rib on one of said adaptor and said sleeve and a slot on the other of said adaptor and said sleeve.

2. The mounting mechanism as set forth in claim 1 wherein said means preventing relative rotational movement of the mirror comprises a stem on the retainer and a non-circular opening on said cup through which said stem extends, said stem having a complementary non-circular cross section.

3. The mounting mechanism as set forth in claim 2 wherein the cross section of said non-circular opening and the cross section of said stem are rectangular.

4. The mounting mechanism as set forth in claim 2 wherein said means for maintaining assembled relationship of said cup, said adaptor, said sleeve and said retainer includes spring means yieldingly holding said cup, said adaptor, said sleeve and said retainer.

5. The mounting mechanism as set forth in claim 4 wherein said spring means comprises a spring around said stem and on said cup.

6. A mounting mechanism for supporting a mirror:
   a bracket for supporting the mounting mechanism,
   a cup having an inner spherical portion, said cup secured to said bracket and fixedly held in a stationary position,
   an adaptor having a spherical portion, said spherical portion engaged to said inner spherical portion of said cup,
   a sleeve having a hemispherical shape, said sleeve engaging to the interior of said spherical portion of said adaptor,
   a retainer having a spherical portion, said spherical portion engaging the interior of said sleeve,
   means for mounting the mirror on said adaptor,
   means for maintaining said cup, said adaptor, said sleeve and said retainer in assembled relationship while permitting relative movement,
   means for preventing relative rotational movement of the mirror about an axis perpendicular to the mounting mechanism,
   interengaging means for limiting relative movement between said adaptor and said sleeve in a first plane, and
   interengaging means for limiting relative movement between said sleeve and said retainer in a second plane at an angle to the first plane,
   said means limiting relative movement between said adaptor and said sleeve including a rib on one of said adaptor and said sleeve and a groove on the other of said adaptor and said sleeve.

7. A mounting mechanism for supporting a mirror:
   a bracket for supporting the mounting mechanism, a cup having an inner spherical portion, said cup secured to said bracket and fixedly held in a stationary position, an adaptor having a spherical portion, said spherical portion engaged to said inner spherical portion of said cup, a sleeve having a hemispherical shape, said sleeve engaging to the interior of said spherical portion of said adaptor, a retainer having a spherical portion, said spherical portion engaging the interior of said sleeve, means for mounting the mirror on said adaptor, means for maintaining said cup, said adaptor, said sleeve and said retainer in assembled relationship while permitting relative movement, means for preventing relative rotational movement of the mirror about an axis perpendicular to the mounting mechanism, interengaging means for limiting relative movement between said adaptor and said sleeve in a first plane, and interengaging means for limiting relative movement between said sleeve and said retainer in a second plane at an angle to the first plane, said means limiting relative movement between said sleeve and said retainer including a rib on one of said sleeve and said retainer and a groove on the other of said sleeve and said retainer.

8. A mounting mechanism for supporting a mirror:
a bracket for supporting the mounting mechanism, a cup having an inner spherical portion, said cup secured to said bracket and fixedly held in a stationary position, an adaptor having a spherical portion, said spherical portion engaged to said inner spherical portion of said cup, a sleeve having a hemispherical shape, said sleeve engaging to the interior of said spherical portion of said adaptor, a retainer having a spherical portion, said spherical portion engaging the interior of said sleeve, means for mounting the mirror on said adaptor, means for maintaining said cup, said adaptor, said sleeve and said retainer in assembled relationship while permitting relative movement, means for preventing relative rotational movement of the mirror about an axis perpendicular to the mounting mechanism, interengaging means for limiting relative movement between said adaptor and said sleeve in a first plane, and interengaging means for limiting relative movement between said sleeve and said retainer in a second plane at an angle to the first plane, said means limiting relative movement between said sleeve and said retainer including a rib on one of said sleeve and said retainer and a slot on the other of said sleeve and said retainer.

9. A mounting mechanism for supporting a mirror comprises:

a mounting bracket for supporting the mounting mechanism, a cup having a non-circular centrally located opening, and means for mounting said cup on said bracket, said means being secured to said mounting bracket to hold said cup in a fixed stationary position, an adaptor having a spherical portion with a centrally located opening, said spherical portion engaging the inner surface of said cup, a sleeve having a hemispherical shape with a centrally located opening, said sleeve engaging the interior of said spherical portion of said adaptor, a retainer including a stem having a non-circular cross section, said cup having a complementary non-circular cup opening for coupling said retainer and said cup, a spherical portion supporting said stem portion, said spherical portion engaging the underside of said sleeve, said stem being received in said centrally located openings of said sleeve, said adaptor and said cup, said adaptor and said sleeve having interengaging means for limiting relative movement between said adaptor and said sleeve, said sleeve and said retainer having interengaging means for limiting relative movement between said sleeve and said retainer, a spring mounted on said cup and surrounding said stem, a retainer demountably attached to the top of said stem portion and securing said spring such that said spring urges said retainer and said cup toward each other, holding said adaptor and a mounting bracket for the mirror, said mounting bracket being engaged to said adaptor, said interengaging means between said adaptor and said sleeve comprising at least one slot located on said interior of said spherical portion of said adaptor and adjacent said adaptor opening, and at least one rib located on the exterior of said sleeve and adjacent said sleeve opening, wherein said exterior rib extends into said slot of said adaptor.

10. The mounting mechanism as set forth in claim 9 wherein said interengaging means comprises a pair of aligned slots on said spherical portion of said adaptor and on opposite sides of said adaptor opening, and a pair of aligned ribs on the exterior of said sleeve and on opposite sides of said sleeve opening, wherein said aligned exterior ribs extend into said aligned slots of said adaptor.

11. The mounting mechanism as set forth in claim 9 wherein said interengaging means comprises at least one groove on the interior of said sleeve and positioned 90° from said exterior rib, and a rib located on the exterior of said spherical portion of said retainer, wherein said exterior rib of said retainer extends into said groove of said sleeve.

12. The mounting mechanism as set forth in claim 9 wherein said interengaging means comprises a pair of aligned grooves on the interior of said sleeve and on opposite sides of said sleeve opening and a pair of ribs on the exterior of said spherical portion of said retainer and on opposite sides of said stem portion, wherein said exterior ribs extend into said grooves of said sleeve.

13. The mounting mechanism as set forth in claim 9 wherein said non-circular centrally located opening is rectangular in shape and said stem portion has a rectangular cross section that is complementary with said rectangular cup opening.

14. An adjustable rear view mirror for an automotive vehicle comprising:

a housing including a mounting flange on one end and an opening in the other end and an end bracket intermediate the ends of said housing;

a mirror;
a mounting mechanism for supporting said mirror wherein said mechanism comprises,
a mounting bracket for supporting the mounting mechanism,
a cup having a non-circular centrally located opening, and
means for mounting said cup on said bracket, said means being secured to said mounting bracket to hold said cup in a fixed stationary position,
an adaptor having a spherical portion with a centrally located opening, said spherical portion engaging the inner surface of said cup,
a sleeve having a hemispherical shape with a centrally located opening, said sleeve engaging the interior of said spherical portion of said adaptor,
a retainer including a stem having a non-circular cross section, said cup having a complementary non-circular cup opening for coupling said retainer and said cup,
a spherical portion supporting said stem portion, said spherical portion engaging the underside of said sleeve,
said stem being received in said centrally located openings of said sleeve, said adaptor and said cup,
said adaptor and said sleeve having interengaging means for limiting relative movement between said adaptor and said sleeve,
said sleeve and said retainer having interengaging means for limiting relative movement between said sleeve and said retainer,
a spring mounted on said cup and surrounding said stem,
a retainer demountably attached to the top of said stem portion and securing said spring such that said spring urges said retainer and said cup toward each other, holding said adaptor and
a mounting bracket for the mirror,
said mounting bracket being engaged to said adaptor,
said interengaging means between said adaptor and said sleeve comprising at least one slot located on said interior of said spherical portion of said adaptor and adjacent said adaptor opening, and at least one rib located on the exterior of said sleeve and adjacent said sleeve opening, wherein said exterior rib extends into said slot of said adaptor.

15. An adjustable rear view mirror for an automotive vehicle comprising:
a housing including a mounting flange on one end and an opening in the other end and an end bracket intermediate the ends of said housing;
a mirror;
a mounting mechanism for supporting said mirror wherein said mechanism comprises,
a mounting bracket for supporting the mounting mechanism,
a cup having a non-circular centrally located opening, and
means for mounting said cup on said bracket, said means being secured to said mounting bracket to hold said cup in a fixed stationary position,
an adaptor having a spherical portion with a centrally located opening, said spherical portion engaging the inner surface of said cup,
a sleeve having a hemispherical shape with a centrally located opening, said sleeve engaging the interior of said spherical portion of said adaptor,
a retainer including a stem having a non-circular cross section, said cup having a complementary non-circular cup opening for coupling said retainer and said cup,
a spherical portion supporting said stem portion, said spherical portion engaging the underside of said sleeve,
said stem being received in said centrally located openings of said sleeve, said adaptor and said cup,
said adaptor and said sleeve having interengaging means for limiting relative movement between said adaptor and said sleeve,
said sleeve and said retainer having interengaging means for limiting relative movement between said sleeve and said retainer,
a spring mounted on said cup and surrounding said stem,
a retainer demountably attached to the top of said stem portion and securing said spring such that said spring urges said retainer and said cup toward each other, holding said adaptor and
a mounting bracket for the mirror,
said mounting bracket being engaged to said adaptor,
said interengaging means comprising a pair of aligned slots on said spherical portion of said adaptor and on opposite sides of said adaptor opening, and a pair of aligned ribs on the exterior of said sleeve and on opposite sides of said sleeve opening, wherein said aligned exterior ribs extend into said aligned slots of said adaptor.

16. The rear view mirror as set forth in claim 15 wherein said interengaging means comprises at least one groove on the interior of said sleeve and positioned 90° from said exterior rib, and a rib located on the exterior of said spherical portion of said retainer, wherein said exterior rib of said retainer extends into said groove of said sleeve.

17. The rear view mirror as set forth in claim 15 wherein said interengaging means comprises a pair of aligned grooves on the interior of said sleeve and on opposite sides of said sleeve opening and a pair of ribs on the exterior of said spherical portion of said retainer and on opposite sides of said stem portion, wherein said exterior ribs extend into said grooves of said sleeve.

18. The rear view mirror as set forth in claim 16 wherein said non-circular centrally located opening is rectangular in shape and said stem portion has a rectangular cross section that is complementary with said rectangular cup opening.

* * * * *